United States Patent
Mednik (10) Patent No.: US 12,431,816 B1
(45) Date of Patent: Sep. 30, 2025

(54) SECONDARY-SIDE FLYBACK CONVERTER CONTROLLER

(71) Applicant: Microchip Technology Incorporated, Chandler, AZ (US)

(72) Inventor: Alexander Mednik, Campbell, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 529 days.

(21) Appl. No.: 17/665,272

(22) Filed: Feb. 4, 2022

Related U.S. Application Data (60) Provisional application No. 63/281,001, filed on Nov. 18, 2021.

(51) Int. Cl.
*H02M 3/335* (2006.01)
*H02M 1/00* (2006.01)
*H02M 1/32* (2007.01)

(52) U.S. Cl.
CPC ..... *H02M 3/33592* (2013.01); *H02M 1/0058* (2021.05); *H02M 1/322* (2021.05)

(58) Field of Classification Search
CPC ........... H02M 3/33592; H02M 1/0058; H02M 1/0009; H02M 1/322; H02M 1/342; Y02B 70/10
See application file for complete search history.

(56) References Cited

U.S. PATENT DOCUMENTS

| | | | | |
|---|---|---|---|---|
| 5,719,755 A * | 2/1998 | Usui | ................. | H02M 3/33576 |
| | | | | 363/19 |
| 8,358,090 B1 * | 1/2013 | Mednik | ................ | H05B 45/382 |
| | | | | 315/225 |
| 8,570,772 B2 * | 10/2013 | Morris | .................... | H02M 1/32 |
| | | | | 363/21.17 |
| 9,413,246 B2 * | 8/2016 | Luo | ......................... | H02M 1/08 |
| 9,742,288 B2 * | 8/2017 | Balakrishnan | .... | H02M 3/33507 |
| 9,780,666 B2 * | 10/2017 | Odell | ................. | H02M 3/33576 |

(Continued)

OTHER PUBLICATIONS

European Patent Office, International Search Report for International Application No. PCT/US2022/029739, dated Sep. 6, 2022.

*Primary Examiner* — Yusef A Ahmed
(74) *Attorney, Agent, or Firm* — Shumaker, Loop & Kendrick, LLP; Ryan Corbett (57) ABSTRACT

A flyback converter to receive an input voltage and provide an output voltage is provided, and may include a transformer having a primary winding and secondary winding, a primary switch coupled to the primary winding, a synchronous rectifier device coupled to the secondary winding, and a secondary side control circuit to turn on the synchronous rectifier device by outputting a control signal at a first amplitude, subsequently modify the control signal to maintain a voltage across the synchronous rectifier device substantially constant until a predicted time that precedes a current in the synchronous rectifier device reaching substantially zero, subsequently turn off the synchronous rectifier device based on the voltage across the synchronous rectifier device reaching substantially zero, and subsequently turn on the synchronous rectifier device by outputting the control signal at a second amplitude, before the primary switch is turned on. The second amplitude is less than the first amplitude.

24 Claims, 9 Drawing Sheets

(56) References Cited

U.S. PATENT DOCUMENTS

| | | | |
|---|---|---|---|
| 9,899,931 B1* | 2/2018 | Chang | H02M 3/33592 |
| 9,935,559 B2* | 4/2018 | Kong | H02M 3/33592 |
| 9,991,811 B1* | 6/2018 | Song | H02M 1/083 |
| 9,998,021 B2* | 6/2018 | Chang | H02M 1/08 |
| 10,566,893 B2 | 2/2020 | Yang et al. | |
| 11,177,740 B1* | 11/2021 | Yau | H02M 1/15 |
| 11,277,073 B2* | 3/2022 | Jitaru | H01F 38/42 |
| 12,136,885 B2* | 11/2024 | Yang | H02M 3/33592 |
| 2006/0013022 A1* | 1/2006 | Jitaru | H02M 1/38 363/21.12 |
| 2007/0121349 A1* | 5/2007 | Mednik | H02M 3/33523 363/21.01 |
| 2009/0257250 A1* | 10/2009 | Liu | H02M 3/33592 363/21.01 |
| 2010/0027298 A1* | 2/2010 | Cohen | H02M 3/33592 363/21.14 |
| 2010/0110732 A1* | 5/2010 | Moyer | H02M 3/33592 363/19 |
| 2013/0272036 A1* | 10/2013 | Fang | H02M 3/33515 363/21.17 |
| 2014/0112030 A1* | 4/2014 | Fahlenkamp | H02M 3/33523 363/21.14 |
| 2014/0218976 A1* | 8/2014 | Luo | H02M 1/08 363/21.01 |
| 2015/0280573 A1* | 10/2015 | Gong | H02M 3/33592 363/21.14 |
| 2015/0280584 A1* | 10/2015 | Gong | H02M 3/33592 363/21.13 |
| 2016/0111961 A1* | 4/2016 | Balakrishnan | H02M 3/33507 363/21.12 |
| 2016/0141961 A1* | 5/2016 | Odell | H02M 3/33507 363/21.17 |
| 2016/0182131 A1* | 6/2016 | Mednik | H02M 3/33523 455/41.1 |
| 2016/0233779 A1* | 8/2016 | Cohen | H02M 3/33592 |
| 2016/0294298 A1* | 10/2016 | Wong | H02M 3/33592 |
| 2017/0317598 A1* | 11/2017 | Ptacek | H02M 3/33592 |
| 2017/0353099 A1* | 12/2017 | Yang | H02M 1/08 |
| 2018/0115252 A1* | 4/2018 | Chang | H02M 3/33592 |
| 2018/0294735 A1* | 10/2018 | Song | H02M 1/083 |
| 2019/0123655 A1* | 4/2019 | Hirose | H02M 3/33592 |
| 2019/0149032 A1* | 5/2019 | Yang | H02M 1/083 363/21.14 |
| 2019/0222131 A1* | 7/2019 | King | H02M 1/088 |
| 2020/0036293 A1* | 1/2020 | Kannan | H02M 3/33523 |
| 2020/0153327 A1* | 5/2020 | Lin | H02M 3/33592 |
| 2020/0153353 A1* | 5/2020 | King | H02M 1/088 |
| 2020/0280263 A1* | 9/2020 | Lin | H02M 3/33592 |
| 2021/0119526 A1* | 4/2021 | Chung | H02M 3/33523 |
| 2022/0200453 A1* | 6/2022 | Mednik | H02M 1/0025 |
| 2022/0200466 A1* | 6/2022 | Guo | H02M 1/38 |
| 2022/0209676 A1* | 6/2022 | Li | H02M 3/01 |
| 2022/0271676 A1* | 8/2022 | Yang | H02M 3/33523 |
| 2023/0216421 A1* | 7/2023 | Shen | H02M 3/33592 363/21.06 |
| 2024/0154537 A1* | 5/2024 | Guo | H02M 1/348 |

* cited by examiner

SECONDARY-SIDE FLYBACK CONVERTER CONTROLLER

CROSS-REFERENCE TO RELATED APPLICATION

This application claims the benefit of U.S. Provisional Patent Application No. 63/281,001, filed on Nov. 18, 2021, which is incorporated herein by reference in its entirety.

TECHNICAL FIELD

The present disclosure relates generally to flyback converters, and more specifically to a flyback converter using a controller on the secondary winding side to facilitate zero-voltage switching and synchronous rectification.

BACKGROUND

Increased demand for high-efficiency flyback converters gave rise to various solutions using an active clamp to facilitate zero-voltage switching (ZVS) of the switching device. Some of these active clamp flyback converters maintain a complimentary drive of the clamp switch; others only activate the clamp switch for a brief period immediately before turning the controlled switching device on. Both types of solutions are intended to develop current in reverse direction in the power transformer windings and then provide a dead time to allow for discharging the parasitic capacitance of the switching node to substantially zero voltage.

Figure 1:
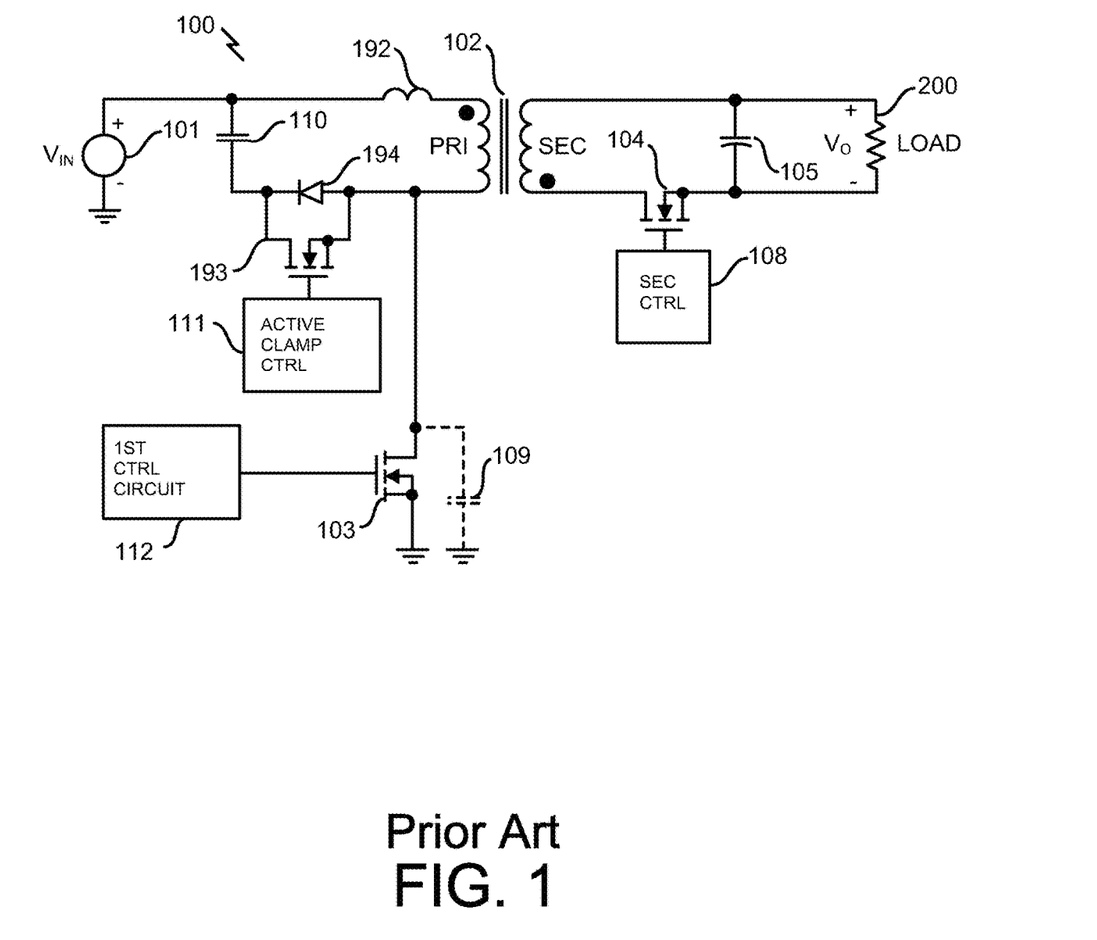
FIG. 1 shows an active clamp flyback converter according to the prior art.

FIG. 1 shows an active clamp flyback converter 100 using an active clamp at the primary winding of the transformer according to the prior art. The flyback converter 100 receives input voltage VIN from a voltage source 101 and delivers output voltage VO to a load 200. The flyback converter 100 includes a flyback transformer 102 having a primary winding PRI and a secondary winding SEC, a primary switch 103 activated by a first control circuit 112, a synchronous rectifier switch 104 activated by a second control circuit 108, an output smoothing capacitor 105, a clamp diode 194, and a clamp capacitor 110. The flyback converter 100 further includes an active clamp switch 193. The active clamp switch 193 is coupled across the clamp diode 194 to provide a path for reverse current in the primary winding PRI of the transformer 102. The inductance 192 represents leakage inductance reflected to the primary winding PRI. The active clamp flyback converter 100 recirculates energy stored in the leakage inductance 192. However, it suffers added cost and complexity of driving the active clamp switch 193, which is activated by an active clamp control circuit 111. The reverse current of the primary winding PRI recirculates the energy stored in parasitic capacitance 109 back to the input voltage source 101 before the primary switch 103 turns on.

Figure 2:
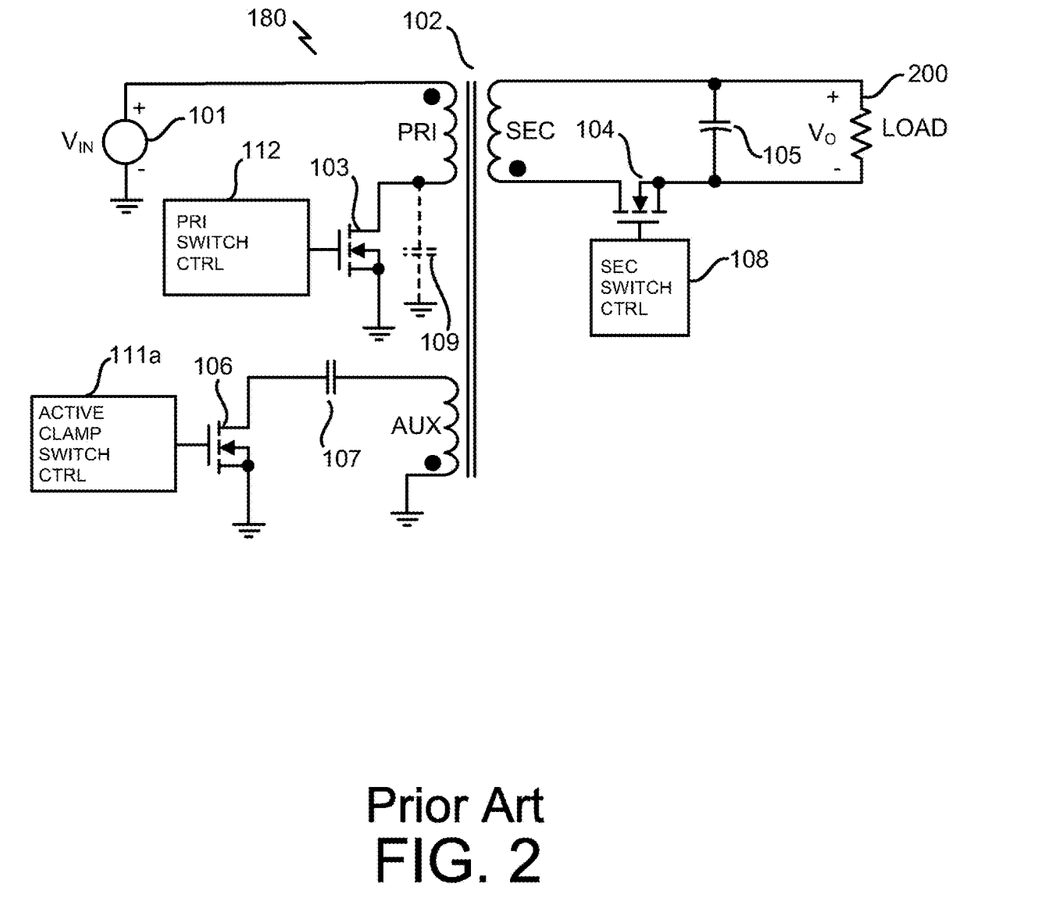
FIG. 2 shows a flyback converter having an auxiliary winding according to the prior art.

Other types of converters use an auxiliary winding to generate the reverse current. An example of such a converter 180 is depicted in FIG. 2. The converter 180 includes all elements of the converter 100 of FIG. 1, with the exception of the clamp diode 194, clamp capacitor 110, active clamp switch 193, and active clamp control circuit 111. Instead, the flyback transformer 102 of the converter 180 further comprises an auxiliary winding AUX coupled in series with a clamp capacitor 107 and an active clamp switch 106, the active clamp switch activated by a control circuit 111a. The reverse current is developed in the auxiliary winding AUX by means of coupling it across the clamp capacitor 107 via the active clamp switch 106 for a brief period Once the active clamp switch 106 turns off, the resulting negative magnetic flux induces reverse current in the primary winding PRI, recirculating the energy stored in the parasitic capacitance 109 back to the input voltage source 101. The converter 180 does not recirculate the leakage inductance energy, and it must be absorbed by some other means. However, the solution offers a lower overall cost.

Figure 3:
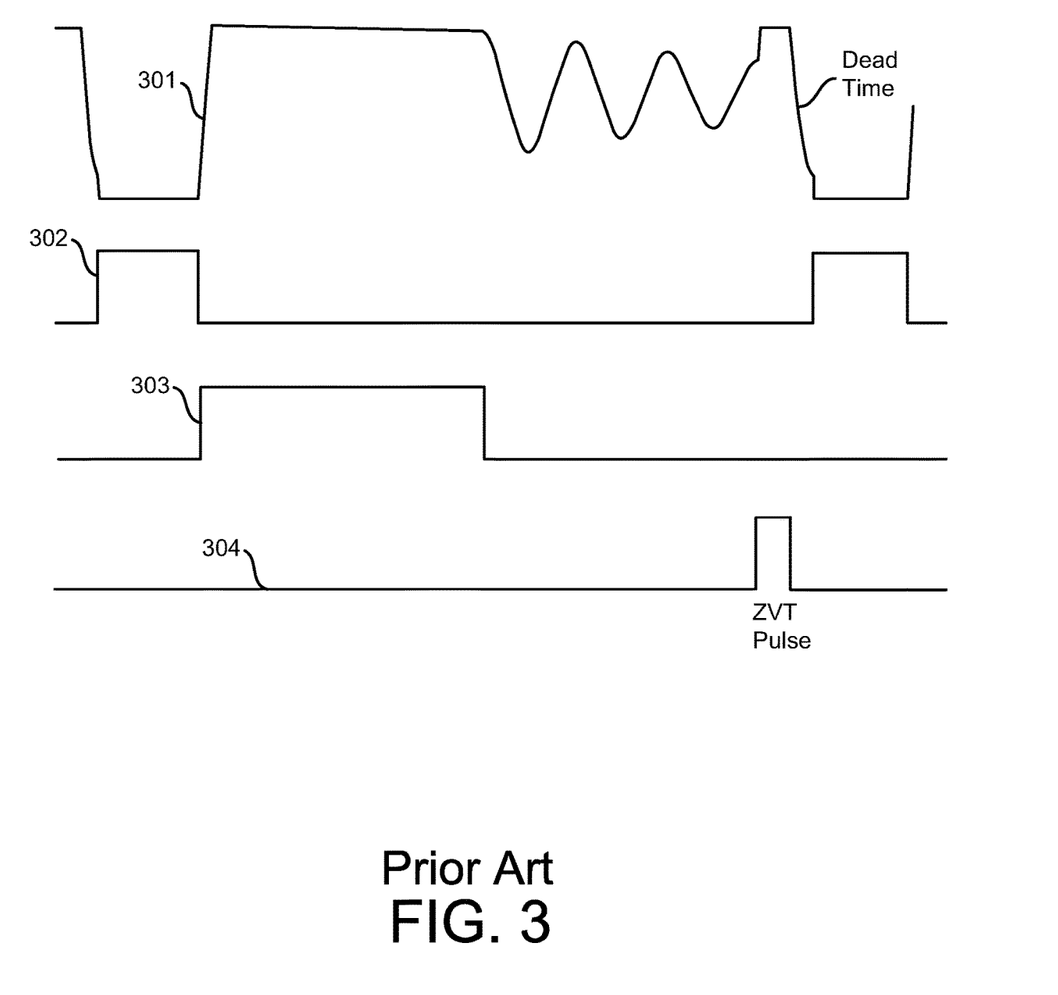
FIG. 3 shows a waveform diagram illustrating the operation of the flyback converters of FIGS. 1 and 2.

FIG. 3 illustrates the operating principle of the converters of FIGS. 1 and 2 with the active clamp switches 193 and 106, respectively, activated for a brief period preceding the turn on of the primary switch 103. The waveform 301 represents the voltage across the primary switch 103. The waveforms 302 and 303 represent the conductive states of the primary switch 103 and the synchronous rectifier device 104, respectively. The conductive state of the synchronous rectifier device 104 may be followed by post-conduction oscillation of the voltage across the primary switch 103 illustrated by the waveform 301. The oscillation period is determined primarily by the inductance of the primary winding PRI and the parasitic capacitance 109. The waveform 304 represents the ZVT Pulse activating the active clamp switches 193 and 106, respectively. The delay between the trailing edge of the ZVT Pulse and the rising edge of the waveform 302 represents the Dead Time allowing for discharging of the parasitic capacitance 109.

Although the synchronous rectifier device 104 can also be utilized to allow for the reverse magnetic flux in the transformer 102, thus eliminating the need for an extra active clamp switch and an auxiliary winding and reducing the cost of the overall solution, driving the synchronous rectifier device 104 introduces excessive gate drive losses having an adverse effect on the converter efficiency. Therefore, a control method is needed to reduce the synchronous rectifier device 104 gate drive power losses when the synchronous rectifier device 104 is used for this dual purpose. Separately, an appropriate control algorithm is needed for generation of the ZVT Pulse for driving the synchronous rectifier device 104 when the synchronous rectifier device 104 is used for this dual purpose.

SUMMARY

According to an aspect of one or more examples, there is provided a flyback converter to receive an input voltage and provide an output voltage. The flyback converter may include a transformer having a primary winding and secondary winding, a primary switch coupled to the primary winding, a synchronous rectifier device coupled to the secondary winding, and a secondary side control circuit to turn on the synchronous rectifier device by outputting a control signal at a first amplitude, subsequently modify the control signal to maintain substantially constant voltage across the synchronous rectifier device until a predicted time that precedes a current in the synchronous rectifier device reaching zero, subsequently turn off the synchronous rectifier device based on the voltage across the synchronous rectifier device reaching substantially zero, and subsequently turn on the synchronous rectifier device by outputting the control signal at a second amplitude, before the primary switch is turned on. The second amplitude may be less than the first amplitude.

The secondary side control circuit may include a synchronous rectifier control circuit that may predict the predicted time that precedes a time at which the current in the synchronous rectifier device reaches substantially zero. The synchronous rectifier control circuit may have a transconductance error amplifier, and the synchronous rectifier control circuit may store a voltage level at an output of the transconductance error amplifier sampled at the predicted time. The second amplitude may substantially equal the stored voltage level at the predicted time.

The synchronous rectifier control circuit may predict the predicted time that precedes the time at which the current in the synchronous rectifier device reaches substantially zero by integrating a difference between the voltage across the synchronous rectifier device and the output voltage.

The synchronous rectifier control circuit may predict the predicted time that precedes the time at which the current in the synchronous rectifier device reaches substantially zero by integrating the voltage across the secondary winding.

The secondary side control circuit may turn on the synchronous rectifier device by outputting the control signal at the first amplitude in response to detecting that the voltage across the synchronous rectifier device is negative, and may reduce the control signal from the first amplitude as the current in the synchronous rectifier device decreases.

The secondary side control circuit may hold the control signal at a substantially constant level after the predicted time, before turning off the synchronous rectifier device based on the voltage across the synchronous rectifier device reaching substantially zero.

The voltage across the synchronous rectifier device may enter oscillation when the synchronous rectifier device is turned off. The secondary side control circuit may turn on the synchronous rectifier device at the last valley of the oscillation of the voltage across the synchronous rectifier device before the primary switch is turned on.

The secondary side control circuit may include a pulse generator circuit that may detect a period of the oscillation of the voltage across the synchronous rectifier device. The secondary side control circuit may turn on the synchronous rectifier device before the primary switch is turned on for a duration of time based on the detected period of oscillation of the voltage across the synchronous rectifier device.

The flyback converter may also include a primary switch control circuit that may turn on the primary switch after a dead time delay following the turn off of the synchronous rectifier device.

According to an aspect of one or more examples, there is provided a method of controlling a flyback converter that includes a transformer having a primary winding and a secondary winding, a primary switch coupled to the primary winding, and a synchronous rectifier device coupled to the secondary winding. The method may include outputting a control signal at a first amplitude to turn on the synchronous rectifier device, subsequently modifying the control signal to maintain substantially constant voltage across the synchronous rectifier device until a predicted time that precedes a current in the synchronous rectifier device reaching substantially zero, subsequently turning off the synchronous rectifier device based on the voltage across the synchronous rectifier device reaching substantially zero, subsequently turning on the synchronous rectifier device by outputting the control signal at a second amplitude, before the primary switch is turned on. The second amplitude may be less than the first amplitude.

The method may also include predicting a predicted time that precedes a time at which a current in the synchronous rectifier device reaches substantially zero. The method may also include storing a voltage level of the output of a transconductance error amplifier at the predicted time. The output of the transconductance error amplifier may be based on a difference between the voltage across the synchronous rectifier device and a reference voltage. The second amplitude may substantially equal the stored voltage level at the predicted time.

Predicting the predicted time may include integrating a difference between the voltage across the synchronous rectifier device and an output voltage across the secondary winding.

Predicting the predicted time may include integrating a voltage across the secondary winding.

The outputting of the control signal at the first amplitude to turn on the synchronous rectifier device may occur in response to detecting the voltage across the synchronous rectifier device is negative.

The method may include, after the outputting of the control signal at the first amplitude to turn on the synchronous rectifier device, reducing the control signal from the first amplitude as the current in the synchronous rectifier device decreases.

The method may include, at the predicted time, holding the control signal at a substantially constant level, before turning off the synchronous rectifier device based on the voltage across the synchronous rectifier device reaching substantially zero.

The voltage across the synchronous rectifier device may enter oscillation when the synchronous rectifier device is turned off, and the subsequent turning off of the synchronous rectifier device may occur at the last valley of the oscillation of the voltage across the synchronous rectifier device before the primary switch is turned on.

The method may include detecting a period of the oscillation of the voltage across the synchronous rectifier device. The subsequent turning on of the synchronous rectifier device may be for a duration based on the detected period of oscillation of the voltage across the synchronous rectifier device.

The method may include turning on the primary switch after a dead time delay following the turning off of the synchronous rectifier device.

According to an aspect of one or more examples, there is provided a method of generating an auxiliary pulse signal for controlling a synchronous rectifier device coupled to a secondary winding of a transformer in a flyback converter. The method may include outputting a control signal at a first amplitude, reducing the control signal from the first amplitude as the current in the synchronous rectifier device decreases, predicting a predicted time that precedes a time at which the current in the synchronous rectifier device reaches substantially zero, storing a voltage level of the output of a transconductance amplifier at the predicted time, wherein the output of the transconductance error amplifier is based on a difference between the voltage across the synchronous rectifier device and a reference voltage. The method may also include generating the auxiliary pulse signal so as to output the control signal to turn on the synchronous rectifier device before the primary switch is turned on, the control signal responsive to the auxiliary pulse signal at an amplitude substantially equal to the stored voltage level of the output of the transconductance error amplifier at the predicted time.

According to an aspect of one or more examples, there is provided a method of generating an auxiliary pulse signal for controlling a synchronous rectifier device coupled to a secondary winding of a transformer in a flyback converter. The method may include detecting a period of oscillation of a voltage across the synchronous rectifier device, detecting a peak voltage across the synchronous rectifier device, and generating the auxiliary pulse signal having a pulse width determined based on the detected period of oscillation of the voltage across the synchronous the rectifier device, and a difference between the peak voltage across the synchronous rectifier device and an output voltage of the flyback converter.

DETAILED DESCRIPTION OF VARIOUS EXAMPLES

Reference will now be made in detail to the following various examples, which are illustrated in the accompanying drawings, wherein like reference numerals refer to like elements throughout. The following examples may be embodied in various forms without being limited to the examples set forth herein. Descriptions of well-known parts are omitted for clarity.

Figure 4:
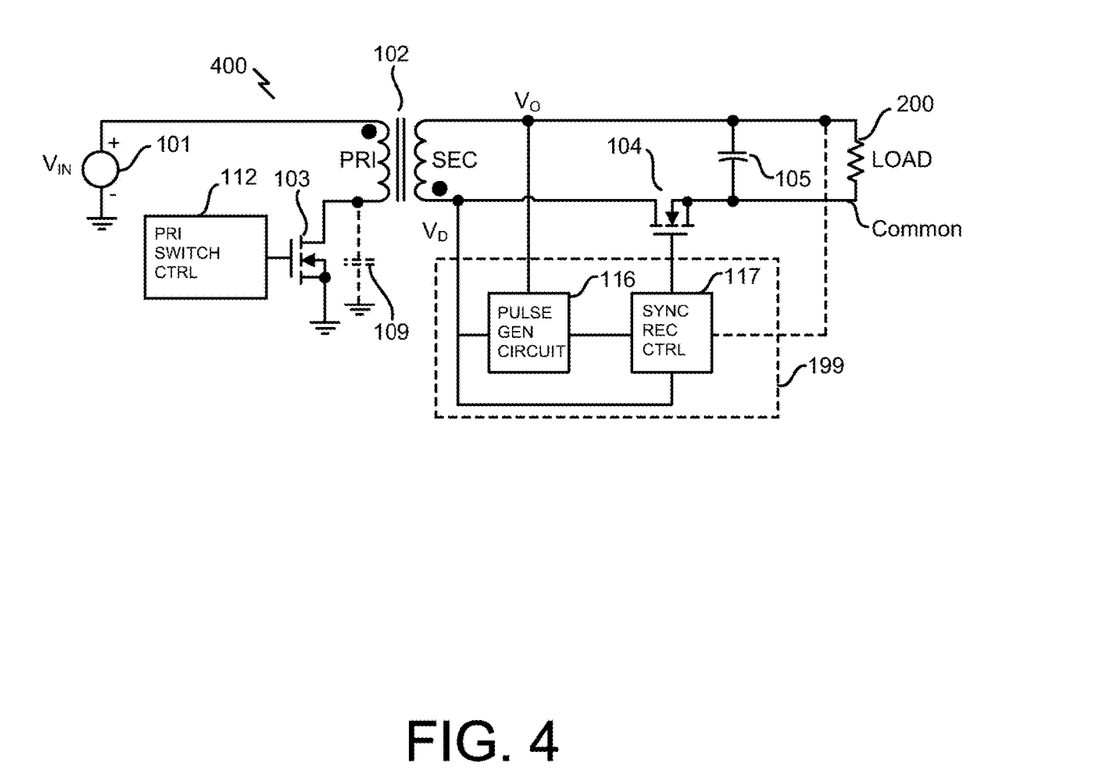
FIG. 4 shows a circuit diagram of a flyback converter according to various examples of the present disclosure.

FIG. 4 is a circuit schematic of a flyback converter 400 in accordance with various examples of the present disclosure. The example flyback converter 400 receives input voltage $V_{IN}$ from an input voltage source 101 and delivers galvanically isolated output voltage $V_O$ to a load 200. The flyback converter 400 includes: a transformer 102 having a primary winding PRI and a secondary winding SEC; a primary switch 103; a primary switch control circuit 112; a synchronous rectifier device 104 coupled to the secondary winding SEC; a secondary side control circuit 199, which may include a synchronous rectifier control circuit 117 and a pulse generator circuit 116; and an output smoothing capacitor 105. The converter 400 also includes effective parasitic capacitance 109. FIG. 4 depicts the capacitance 109 reflected to the primary switch 103, while it needs to be understood as total parasitic capacitance distributed across all elements of the flyback converter 400 and its physical construction.

The primary switch control circuit 112 activates the primary switch 103 repetitively to couple the primary winding PRI to the input voltage source 101 for receiving electrical energy from the input voltage source 101 and storing it in the transformer 102. The secondary side control circuit 199 drives the synchronous rectifier device 104. According to one or more examples, the secondary side control circuit 199 may include the pulse generator circuit 116 that generates an auxiliary pulse signal in accordance with the output voltage $V_O$ and the voltage $V_D$ across the synchronous rectifier device 104. The secondary side control circuit 199 may also include the synchronous rectifier control circuit 117 that controls the synchronous rectifier device 104 in accordance with the voltage $V_D$ across the synchronous rectifier device 104 and the auxiliary pulse signal received from the pulse generator circuit 116. The synchronous rectifier control circuit 117 may also control the synchronous rectifier device 104 based on the output voltage $V_O$, as represented by the dotted line in FIG. 4 connecting the output voltage $V_O$ to the synchronous rectifier control circuit 117.

Figure 5:
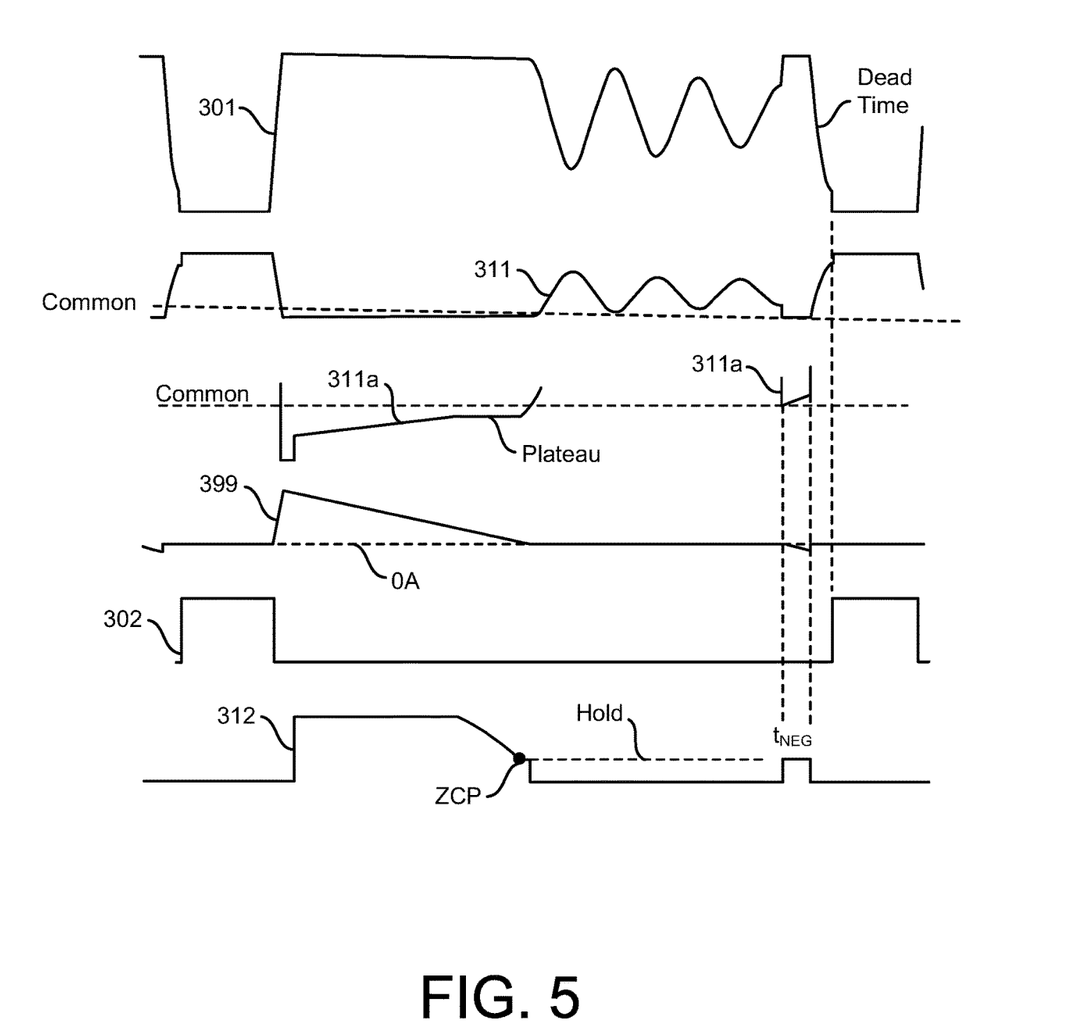
FIG. 5 shows a waveform diagram illustrating the operation of the flyback converter shown in FIG. 4.

The operating principle of the flyback converter 400 is illustrated by FIG. 5. Referring to FIGS. 4 and 5, the waveform 301 represents the voltage across the primary switch 103. The waveform 311 represents the voltage $V_D$ across the synchronous rectifier device 104, whereas its exploded portion in the vicinity of the common return voltage is shown by the waveform 311a. The waveform 399 represents the current in the synchronous rectifier device 104, which substantially equals the current in the secondary winding SEC of the transformer 102. The waveform 302 shows the primary control signal to the primary switch 103 generated by the primary switch control circuit 112, whereas the waveform 312 represents the control voltage to the synchronous rectifier device 104 generated by the synchronous rectifier control circuit 117.

As illustrated by the waveform 311a, following the turn-off of the primary switch 103, voltage $V_D$ across the synchronous rectifier device 104 becomes negative. The synchronous rectifier control circuit 117 detects this negative voltage $V_D$ and switches the synchronous rectifier device 104 fully on as illustrated by the waveform 312. Upon the turn-on of the synchronous rectifier device 104, the voltage $V_D$ across it is determined by the on resistance of the synchronous rectifier device 104. As the current in secondary winding SEC decreases, as shown by waveform 399, the corresponding voltage $V_D$ across the synchronous rectifier device 104 decreases proportionally until it reaches a level designated as Plateau in the waveform 311a. The synchronous rectifier control circuit 117 maintains this Plateau level of voltage $V_D$ across the synchronous rectifier device 104 by reducing the control voltage to the synchronous rectifier device 104 as shown by waveform 312 so as to increase the on resistance of the synchronous rectifier device 104 as the current through the synchronous rectifier device 104 (shown as waveform 399), i.e. the current through secondary winding SEC, falls towards zero. The synchronous rectifier control circuit 117 further predicts a predicted time that precedes the current in the synchronous rectifier device 104 reaching substantially zero by, for example, integrating the difference between voltage $V_D$ across the synchronous rectifier device 104 and the output voltage $V_O$. The synchronous rectifier control circuit 117 may alternatively predict a predicted time that precedes the current in the synchronous rectifier device 104 reaching substantially zero by integrating the voltage across the secondary winding SEC, i.e. $V_O - V_D$. When this predicted time, designated on the waveform 312 as ZCP, is reached, the synchronous rectifier control circuit 117 changes its output to a high impedance, thus no longer driving the control voltage to the synchronous rectifier device 104 as shown by waveform 312. When the synchronous rectifier control circuit 117 changes its output to a high impedance, there is no discharge path for the gate of the synchronous rectifier device 104, so the control voltage to the synchronous rectifier device 104, shown by waveform 312, remains at a substantially constant level.

This substantially constant voltage level of the gate of the synchronous rectifier device 104 dictates a substantially constant on resistance of the synchronous rectifier device 104. Accordingly, the voltage $V_D$ across the synchronous rectifier device 104 falls out of the regulated Plateau level and begins approaching zero, while its magnitude is now dictated by the product of the substantially constant on resistance of the synchronous rectifier device 104 held from ZCP and the current in the synchronous rectifier device 104. When the voltage $V_D$ across the synchronous rectifier device 104 reaches substantially zero level, designated as Common in the waveform 311a, the synchronous rectifier control circuit 117 turns the synchronous rectifier device 104 off by driving the control voltage to the synchronous rectifier device 104 as shown by waveform 312 to substantially zero voltage. The level of the control voltage to the synchronous rectifier device 104 as shown by waveform 312 to the synchronous rectifier device 104 is sampled at ZCP, and is stored to subsequently set the amplitude of the control signal based on an auxiliary pulse signal, having pulse width $t_{NEG}$, as illustrated by the waveform 312.

The auxiliary pulse signal, having pulse width $t_{NEG}$, may be generated by the pulse generator circuit 116 at the last peak of oscillation of the waveform 301, i.e. the last peak of oscillation of the voltage across the primary switch 103, or the last valley of oscillation of the waveform 311, i.e. the last valley of oscillation of the $V_D$ across the synchronous rectifier device 104, that precedes the next turn on of the primary switch 103, and further propagated by the synchronous rectifier control circuit 117 as the control signal to the synchronous rectifier device 104 at the stored amplitude. By reducing the amplitude of the control signal output by the synchronous rectifier control circuit 117, as compared to the amplitude of the control signal that initially switches the synchronous rectifier device 104 fully on as illustrated by the waveform 312, losses in the synchronous rectifier control circuit 117 may be reduced. The auxiliary pulse signal, having pulse width $t_{NEG}$, may reduce switching losses in the synchronous rectifier device 104, by activating the synchronous rectifier device 104 in the last valley of oscillation of the voltage $V_D$ across the synchronous rectifier device 104 that precedes the next turn on of the primary switch 103.

Figure 6:
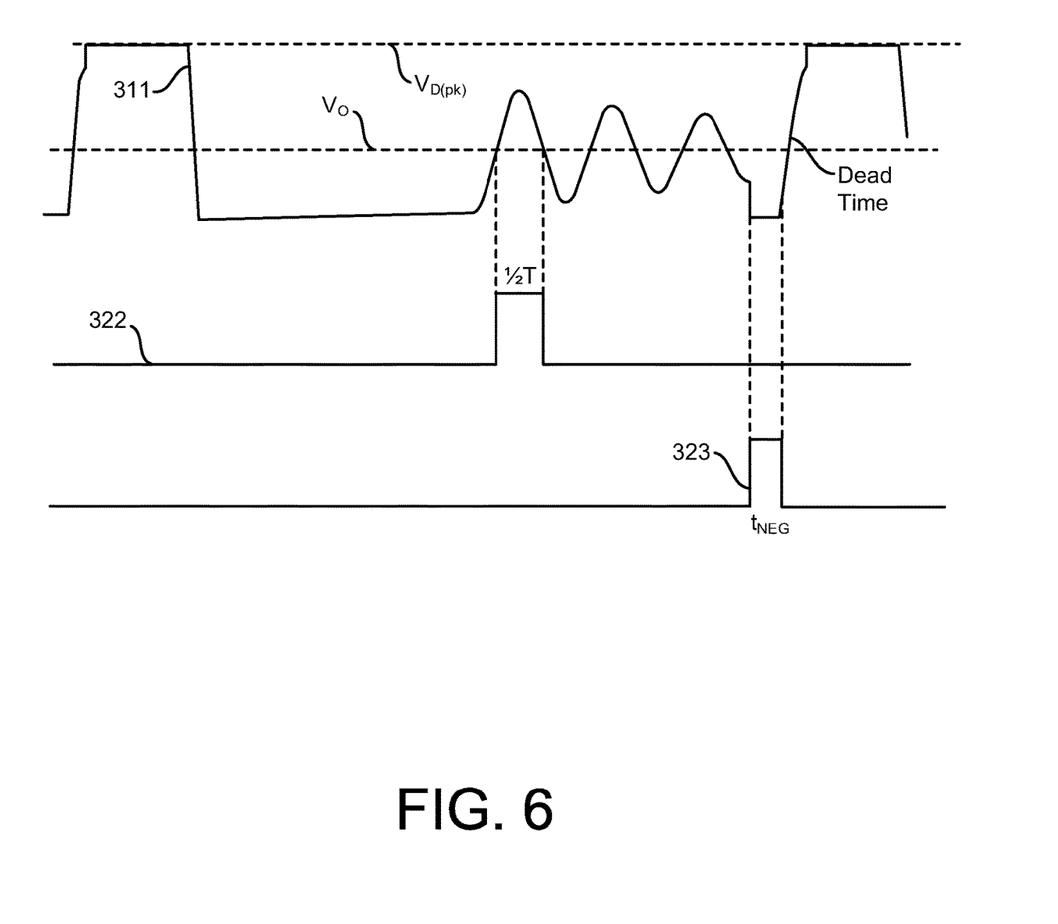
FIG. 6 shows a waveform diagram illustration the operation of a pulse generator circuit according to various examples of the present disclosure.

The principle of operation of the pulse generator circuit 116 according to various examples is illustrated by FIG. 6. The waveform 311 represents the voltage $V_D$ across the synchronous rectifier device 104, referenced to the output voltage level $V_O$. The pulse width of the waveform 322 represents the half-cycle of the oscillation of the voltage $V_D$ across the synchronous rectifier device 104, which is measured by the pulse generator circuit 116. The waveform 323 is the auxiliary pulse signal having pulse width $t_{NEG}$ generated by the pulse generator circuit 116.

The parasitic capacitance 109 may be non-linear since it includes the output capacitance of the primary switch 103, which increases substantially at a lower voltage across it. Therefore, the energy stored in the parasitic capacitance 109 is greater by a factor of $k_{er}>1$ as compared to one calculated as $CV^2/2$. The pulse generator circuit 116 according to various examples monitors the voltage $V_D$ across the synchronous rectifier device 104 and the output voltage $V_O$, and may generate a pulse width $t_{NEG}$ of the auxiliary pulse signal based on the following equation:

$$t_{NEG} = \frac{T}{2} \frac{\sqrt{k_{er}}}{\pi} \cdot \frac{V_{D(pk)} - V_O}{V_O},$$

where $V_{D(PK)}$ is a sampled peak voltage at the synchronous rectifier device 104, and T/2 is the half-cycle of the oscillation of the voltage $V_D$ across the synchronous rectifier device 104 detected by the pulse generator circuit 116.

When generated in accordance with the above equation under the condition of $k_{er}(V_{D(PK)}-V_O)^2/V_O^2 >> 1$, the auxiliary pulse signal may result in a reverse magnetic flux in the transformer 102 that discharges the parasitic capacitance 109 to substantially zero, and may reduce switching power losses. The pulse generator circuit 116, therefore, may generate the auxiliary pulse signal having a pulse width $t_{NEG}$ that is adaptive to the levels of the voltage $V_D$ across the synchronous rectifier device 104 and the output voltage $V_O$, as well as the parasitic capacitance 109 and inductance of the transformer 102.

The primary switch control circuit 112 provides a delay between the trailing edge of the control voltage, generated responsive to auxiliary pulse signal, to the synchronous rectifier device 104, as shown by waveform 312, and the leading edge of the primary control signal, as shown by waveform 302 of FIG. 5, designated as Dead Time in FIGS. 5 and 6. As one skilled in the art would understand, the primary switch control circuit 112 may be coupled to receive an indication of the control signal for the synchronous rectifier device 104 via magnetic, capacitive, or optical devices. The Dead Time delay may be a predetermined delay, and may allow for discharging the parasitic capacitance 109 to substantially zero. According to various examples, the Dead Time delay may be adaptively calculated as a function of the sampled period of oscillation T of the voltage $V_D$ across the synchronous rectifier device 104, as shown in waveform 322, which sampling may be done by the synchronous rectifier control circuit 117. For example, the Dead Time delay may be programmed to be T/4 from when the voltage $V_D$ across the synchronous rectifier device 104 exceeds the output voltage $V_O$.

Figure 7:
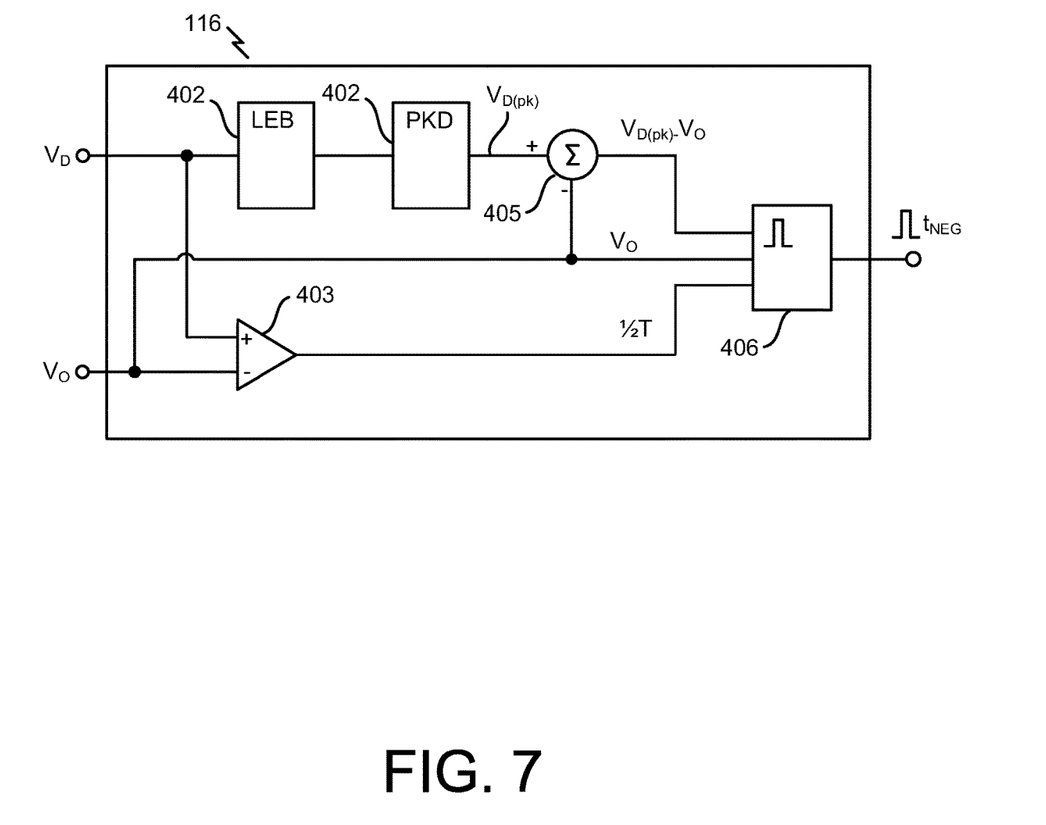
FIG. 7 shows a circuit diagram of a pulse generator circuit according to various examples of the present disclosure.

A pulse generator circuit 116 according to various examples is depicted in FIG. 7. Referring to FIGS. 4 and 7, the pulse generator circuit 116 repetitively generates an auxiliary pulse signal based on the voltage $V_D$ across the synchronous rectifier device 104, and the output voltage $V_O$. The pulse generator circuit 116 may include a leading-edge blanking circuit 401, a peak detector 402, a subtractor circuit 405, a comparator 403, and a pulse width modulation (PWM) circuit 406. The peak detector 402 samples the peak voltage at the synchronous rectifier device 104 $V_{D(PK)}$ after a blanking delay generated by the leading-edge blanking circuit 401. The subtractor 405 further subtracts the output voltage $V_O$ from the sampled peak voltage $V_D(P_K)$. The comparator 403 compares the voltage $V_D$ across the synchronous rectifier device 104 with the output voltage $V_O$ and outputs a pulse width equal to a half-cycle T/2 of the oscillation of the voltage $V_D$ across the synchronous rectifier device 104 responsive to the voltage $V_D$ across the synchronous rectifier device 104 exceeding the output voltage $V_O$. The PWM circuit 406 generates the auxiliary pulse signal having a pulse width $t_{NEG}$ proportional to:

$$t_{NEG} \propto \frac{T}{2} \cdot \frac{V_{D(pk)} - V_O}{V_O}$$

Figure 8:
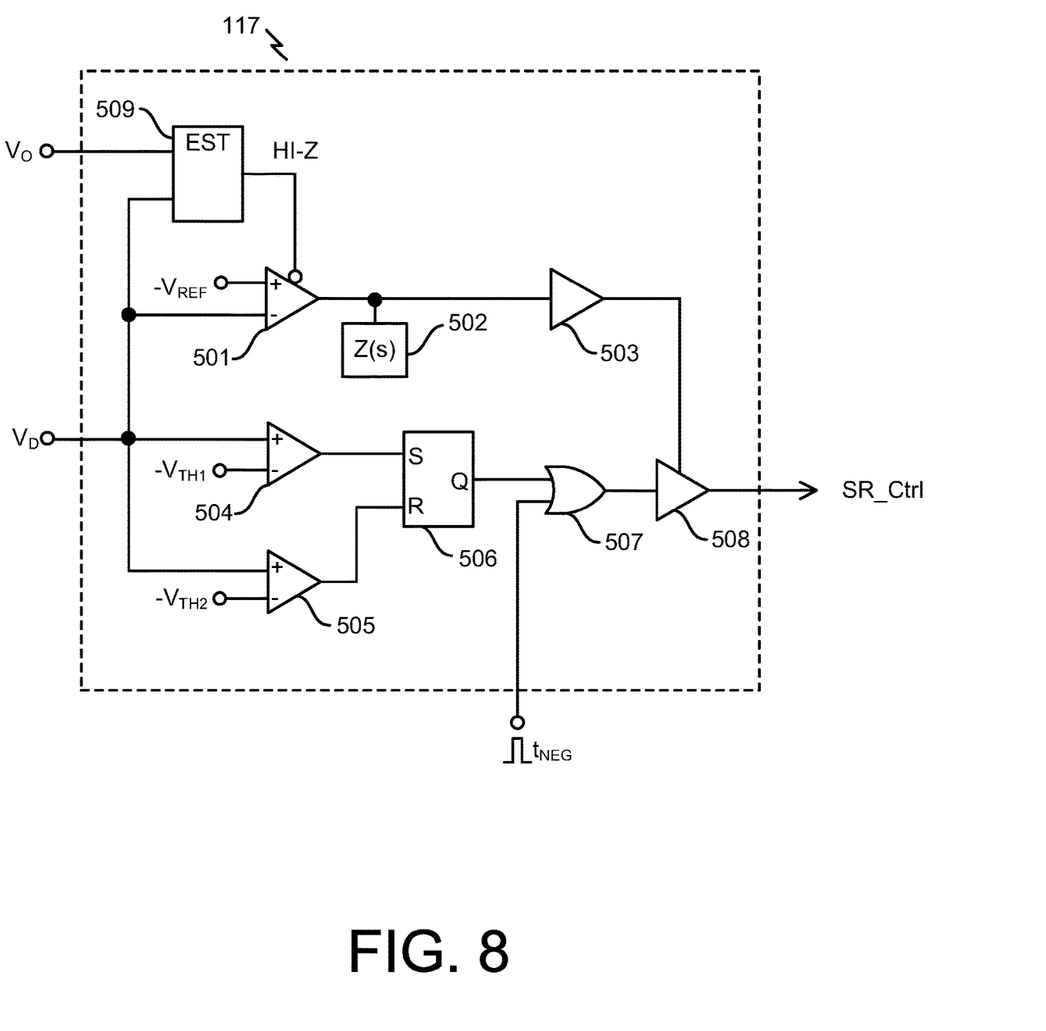
FIG. 8 shows a circuit diagram of a synchronous rectifier control circuit according to various examples of the present disclosure.

A synchronous rectifier control circuit 117 according to various examples is shown in FIG. 8. The synchronous rectifier control circuit 117 depicted in FIG. 8 generates a control signal SR_Ctrl for driving the synchronous rectifier device 104 by monitoring the voltage $V_D$ across the synchronous rectifier device 104. The synchronous rectifier control circuit 117 may also monitor the output voltage $V_O$, and also propagates the auxiliary pulse signal having pulse width $t_{NEG}$ received from the pulse generator circuit 116 to its output, as the control signal SR_Ctrl, at a controlled amplitude. The synchronous rectifier control circuit 117 includes: a first comparator 504 having a non-inverting terminal configured to receive a first reference threshold $-V_{TH1}$ and an inverting terminal configured to receive the voltage $V_D$ across the synchronous rectifier device 104, a second comparator 505 having an inverting terminal configured to receive a second reference threshold $-V_{TH2}$ and a non-inverting terminal configured to receive the voltage $V_D$ across the synchronous rectifier device 104, a transconductance error amplifier 501 having a non-inverting terminal configured to receive a reference voltage $-V_{REF}$, an inverting terminal configured to receive the voltage $V_D$ across the synchronous rectifier device 104, and a tri-state control input HI-Z, a zero current prediction circuit 509, a frequency compensator circuit 502, a voltage buffer 503, a latch circuit 506, an OR gate 507, and an output buffer 508. The magnitudes of the thresholds $-V_{TH1}$, $-V_{TH2}$ and the reference voltage $-V_{TH2}$ are selected to fulfil the condition $V_{TH1} > V_{REF} > V_{TH2}$.

In operation, the first comparator 504 detects negative voltage VD across the synchronous rectifier device 104 falling below the first threshold –VTH1 and sets the latch circuit 506. Transconductance amplifier 501 receives voltage VD across the synchronous rectifier device 104 at its inverting input, a reference voltage –VREF at its non-inverting input, and outputs an amplified error voltage as a function of the difference between VD and –VREF. According to an example, the frequency compensator circuit 502 may be an RC network having an impedance Z(s). While the negative voltage drop across the synchronous rectifier device 104 is significantly greater than –VREF, the output voltage of the transconductance amplifier 104 takes the highest magnitude, as dictated by the output voltage range of the transconductance amplifier 104. The output of the latch circuit 506 then propagates via the gate 507 and the output buffer 508 at the highest output magnitude of the transconductance error amplifier 501, as buffered by voltage buffer 503. The magnitude of the voltage VD across the synchronous rectifier device 104 begins falling until it reaches substantially the reference level –VREF. When the magnitude of the voltage VD across the synchronous rectifier device 104 reaches substantially the reference level –VREF, the voltage at the output of the transconductance error amplifier 501 decreases. The decreasing voltage at the output of the transconductance error amplifier 501, which is buffered by voltage buffer 503, reduces the magnitude of the control signal SR_Ctrl to maintain a substantially constant voltage VD across the synchronous rectifier device 104. As the energy stored in the transformer 102 is gradually depleted, the zero current prediction circuit 509 seeks to predict a predicted time that precedes the time at which the current in the synchronous rectifier device 104 reaches zero.

When this predicted time is reached, the zero current prediction circuit 509 outputs a signal to the high-impedance state input of the error amplifier 501, placing the output of transconductance error amplifier 501 into a high impedance state. The frequency compensator circuit 502 stores the voltage at the output of the transconductance error amplifier 501 at a substantially constant level, i.e. substantially at the voltage level appearing at the output of the transconductance error amplifier 501 when the predicted time is reached. Since the voltage $V_D$ across the synchronous rectifier device 104 is no longer regulated, it begins falling. The second comparator 505 detects the voltage $V_D$ across the synchronous rectifier device reaching the second threshold $-V_{T2}$ and resets the latch circuit 506, terminating the control signal SR_Ctrl through OR gate 507.

When the synchronous rectifier control circuit 117 receives the auxiliary pulse signal having a pulse width $t_{NEG}$, it propagates the auxiliary pulse signal to the control signal SR_Ctrl output via the OR gate 507 and the output buffer 508 at the magnitude of the voltage $V_D$ across the synchronous rectifier device 104 held by the frequency compensator circuit 502 and buffered by the voltage buffer 503.

Figure 9:
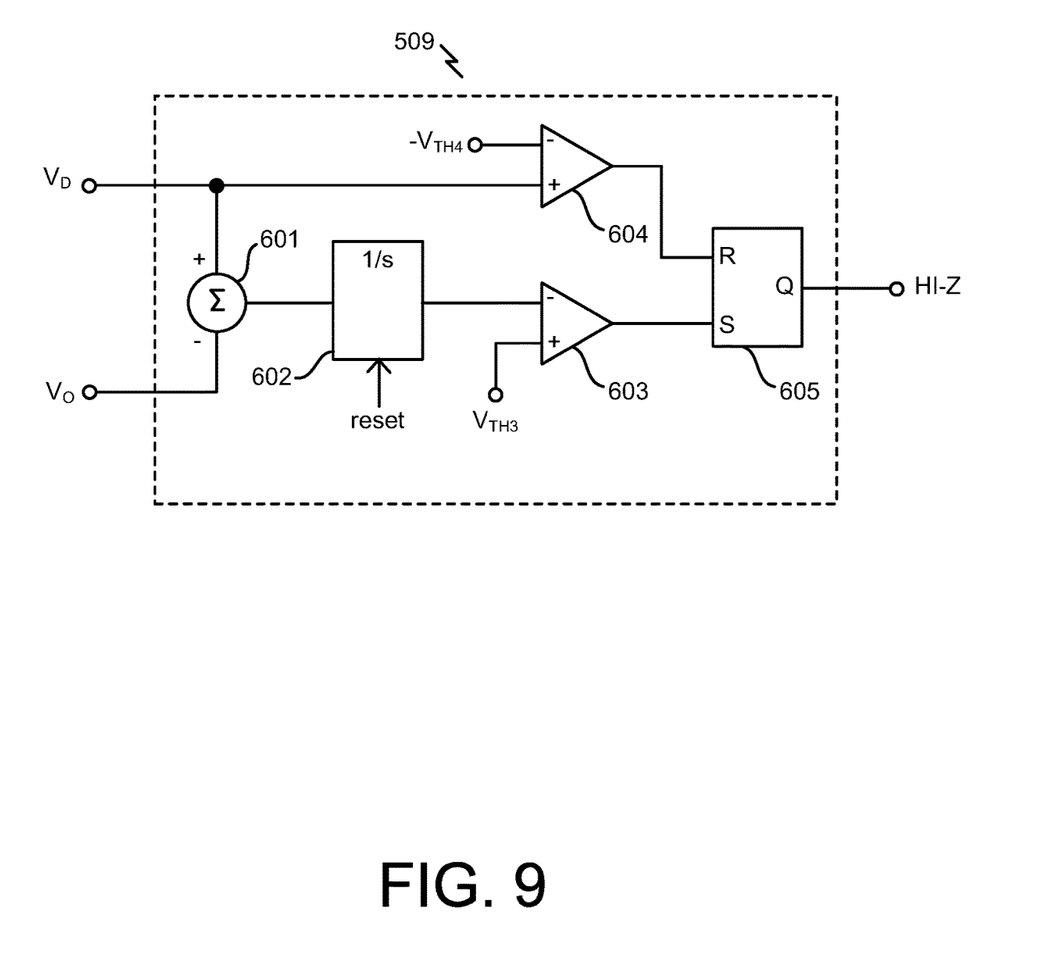
FIG. 9 shows a circuit diagram of a zero current prediction circuit according to various examples of the present disclosure.

FIG. 9 depicts a zero current prediction circuit 509 according to various examples. The zero current prediction circuit 509 depicted in FIG. 9, by monitoring the output voltage $V_O$ and the voltage $V_D$ across the synchronous rectifier device 104, generates a HI-Z command for putting the error amplifier 501 of FIG. 8 into a high-impedance output state. The zero current prediction circuit 509 of FIG. 9 includes: a subtractor 601; an integrator 602 having a reset input; a first comparator 603 with a first threshold voltage $V_{TH3}$; and a latch 605. The integrator 602 integrates over time the difference between the voltage $V_D$ across the synchronous rectifier device 104 and the output voltage $V_O$ derived by the subtraction node 601. The output of the integrator 602 is monitored by the first comparator 603 and compared to the first reference voltage $V_{TH3}$ to predict demagnetization of the transformer 102. The first comparator 603 sets the latch 605 when the output of the integrator 602 reaches the first threshold $V_{TH3}$. The latch 605 can be reset at any arbitrary moment following the auxiliary pulse signal. For clarity, the zero current prediction circuit 509 of FIG. 9 shows a second comparator 604 with a second threshold voltage $-V_{TH4}$. The second comparator 604 detects the voltage $V_D$ across the synchronous rectifier device 104 falling below the second reference voltage $-V_{TH4}$ and resets the latch 605, terminating the HI-Z command.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A flyback converter to receive an input voltage and provide an output voltage, the flyback converter comprising:
    a transformer having a primary winding and secondary winding;
    a primary switch coupled to the primary winding;
    a synchronous rectifier device coupled to the secondary winding; and
    a secondary side control circuit configured to:

turn on the synchronous rectifier device by outputting a control signal at a first amplitude, subsequently reduce the first amplitude of the control signal to maintain a voltage across the synchronous rectifier device at a substantially constant non-zero level until a predicted time, wherein the predicted time precedes a current in the synchronous rectifier device reaching substantially zero, subsequently turn off the synchronous rectifier device in response to the voltage across the synchronous rectifier device reaching substantially zero, wherein the current in the synchronous rectifier device reaches substantially zero before the voltage across the synchronous rectifier device reaches substantially zero, and subsequently turn on the synchronous rectifier device by outputting the control signal at a second amplitude, before the primary switch is turned on;

wherein the second amplitude is less than the first amplitude.

2. The flyback converter of claim 1, wherein the secondary side control circuit includes a synchronous rectifier control circuit to predict the predicted time that precedes the current in the synchronous rectifier device reaching substantially zero.

3. The flyback converter of claim 2, wherein the secondary side control circuit predicts the predicted time by integration of a difference between the voltage across the synchronous rectifier device and the output voltage.

4. The flyback converter of claim 2, wherein the secondary side control circuit predicts the predicted time by integration of a voltage across the secondary winding.

5. The flyback converter of claim 1, wherein the secondary side control circuit includes a synchronous rectifier control circuit having a transconductance error amplifier, wherein the synchronous rectifier control circuit is to store a voltage level at an output of the transconductance error amplifier at the predicted time; and wherein the second amplitude substantially equals the stored voltage level at the predicted time.

6. The flyback converter of claim 1, wherein the secondary side control circuit is configured to turn on the synchronous rectifier device by outputting the control signal at the first amplitude in response to detection that the voltage across the synchronous rectifier device is negative.

7. The flyback converter of claim 1, wherein the secondary side control circuit is configured to reduce the control signal from the first amplitude as the current in the synchronous rectifier device decreases.

8. The flyback converter of claim 1, wherein the secondary side control circuit is configured to hold the control signal at a substantially constant level after the predicted time, before turning off the synchronous rectifier device based on the voltage across the synchronous rectifier device reaching substantially zero.

9. The flyback converter of claim 8, further comprising a primary switch control circuit configured to turn on the primary switch after a dead time delay following the turn off of the synchronous rectifier device.

10. The flyback converter of claim 1, wherein the voltage across the synchronous rectifier device enters oscillation when the synchronous rectifier device is turned off.

11. The flyback converter of claim 10, wherein the secondary side control circuit is configured to turn on the synchronous rectifier device at a last valley of the oscillation of the voltage across the synchronous rectifier device before the primary switch is turned on.

12. The flyback converter of claim 10, wherein the secondary side control circuit includes a pulse generator circuit to detect a period of the oscillation of the voltage across the synchronous rectifier device, and wherein the secondary side control circuit to turn on the synchronous rectifier device before the primary switch is turned on for a duration of time based on the detected period of oscillation of the voltage across the synchronous rectifier device.

13. A method of controlling a flyback converter that includes a transformer having a primary winding and a secondary winding, a primary switch coupled to the primary winding, and a synchronous rectifier device coupled to the secondary winding, the method comprising:

outputting a control signal at a first amplitude to turn on the synchronous rectifier device;

subsequently reducing the first amplitude of the control signal to maintain a voltage across the synchronous rectifier device at a substantially constant non-zero level until a predicted time, wherein the predicted time precedes a current in the synchronous rectifier device reaching substantially zero;

subsequently turning off the synchronous rectifier device in response to the voltage across the synchronous rectifier device reaching substantially zero, wherein the current in the synchronous rectifier device reaches substantially zero before the voltage across the synchronous rectifier device reaches substantially zero;

subsequently turning on the synchronous rectifier device by outputting the control signal at a second amplitude, before the primary switch is turned on, wherein the second amplitude is less than the first amplitude.

14. The method of claim 13, further comprising:

predicting the predicted time that precedes the current in the synchronous rectifier device reaching substantially zero.

15. The method of claim 14, wherein the predicting the predicted time comprises integrating a difference between the voltage across the synchronous rectifier device and an output voltage across the secondary winding.

16. The method of claim 14, wherein the predicting the predicted time comprises integrating a voltage across the secondary winding.

17. The method of claim 13, further comprising:

storing a voltage level of an output of a transconductance error amplifier at the predicted time, wherein the output of the transconductance error amplifier is based on a difference between the voltage across the synchronous rectifier device and a reference voltage;

wherein the second amplitude substantially equals the stored voltage level at the predicted time.

18. The method of claim 13, wherein said outputting the control signal at the first amplitude to turn on the synchronous rectifier device occurs in response to detecting that the voltage across the synchronous rectifier device is negative.

19. The method of claim 13, comprising:

after the outputting of the control signal at the first amplitude to turn on the synchronous rectifier device, reducing the control signal from the first amplitude as the current in the synchronous rectifier device decreases.

20. The method of claim 13, comprising, after the predicted time, holding the control signal at a substantially constant level, before turning off the synchronous rectifier device based on the voltage across the synchronous rectifier device reaching substantially zero.

21. The method of claim 13, wherein the voltage across the synchronous rectifier device enters oscillation when the synchronous rectifier device is turned off; and     wherein said subsequent turning off of the synchronous rectifier device occurs at a last valley of the oscillation of the voltage across the synchronous rectifier device before the primary switch is turned on.

22. The method of claim 21, comprising detecting a period of the oscillation of the voltage across the synchronous rectifier device;

wherein said subsequent turning on of the synchronous rectifier device is for a duration based on the detected period of oscillation of the voltage across the synchronous rectifier device.

23. The method of claim 13, comprising turning on the primary switch after a dead time delay following the turning off of the synchronous rectifier device.

24. A method of generating an auxiliary pulse signal for controlling a synchronous rectifier device coupled to a secondary winding of a transformer in a flyback converter, the method comprising:

outputting a control signal at a first amplitude;

reducing the first amplitude of the control signal from the first amplitude as a current in the synchronous rectifier device decreases;

predicting a predicted time that precedes a time at which the current in the synchronous rectifier device reaches substantially zero, wherein the first amplitude of the control signal is reduced to maintain a voltage across the synchronous rectifier device at a substantially constant non-zero level until the predicted time, and the current in the synchronous rectifier device reaches substantially zero before the voltage across the synchronous rectifier device reaches substantially zero;

storing a voltage level of an output of an error amplifier at the predicted time, wherein the output of the error amplifier is based on a difference between the voltage across the synchronous rectifier device and a reference voltage; and     generating the auxiliary pulse signal so as to output the control signal to turn on the synchronous rectifier device after the voltage across the synchronous rectifier device reaches substantially zero, the control signal responsive to the auxiliary pulse signal and at an amplitude substantially equal to the stored voltage level of the output of the error amplifier at the predicted time.

\* \* \* \* \*